United States Patent Office 3,249,575
Patented May 3, 1966

3,249,575
COLOR CONCENTRATES OF POLYOLEFINS, PIGMENT, AND 2-HYDROXY-METHYL-5-NORBORNENE DIESTERS
Loy S. Engle, Harrington Park, N.J., assignor to Interchemical Corporation, New York, N.Y., a corporation of Ohio
No Drawing. Filed Dec. 18, 1961, Ser. No. 160,701
8 Claims. (Cl. 260—31.8)

This invention relates to novel color concentrates and more particularly to novel color concentrates containing compounds of 2-hydroxymethyl-5-norbornene.

Color concentrates which are also known as color master batches and lacquer chips generally comprise pigment dispersed in a vehicle comprising a resin and, optionally, a plasticizer. Such color concentrates have been used in coatings, inks and, extensively in coloring plastics. According to conventional practices, the mixing or grinding to disperse the pigment in the resinous vehicles is generally accomplished on such apparatus as a 2-roll mill, Banbury Mixer, ball mill and rod mill.

Color concentrates are used in the coloring of plastic articles including sheets, films, filaments, yarns as well as articles made by molding or extrusion. One of the greatest problems has been the production of color concentrates of uniform high quality which produce uniform dispersions in plastics. Poor pigment dispersion leads to poor color strength in plastic articles as well as rough surfaces, scratches on calendared or extruded film and sheeting, breakage in monofilaments, and many other undesirable results. These problems have been particularly acute in the production of color concentrates to be used in the coloring of polyolefins particularly polypropylene and polyethylene.

I have now discovered novel color concentrates which provide uniform pigment dispersions of excellent color strength when used in plastics in general and polyolefins in particular. The vehicles of the novel color concentrates contain compounds of 2-hydroxymethyl-5-norbornene particularly either graft copolymers made by the addition polymerization of methyl methacrylate in the presence of 2-hydroxymethyl-5-norbornene homopolymer or diesters of 2-hydroxymethyl-5-norbornene and a dicarboxylic acid selected from the group consisting of adipic, azelaic and sebacic acids or both said graft copolymers and diesters.

There follows a detailed description of said color concentrates and claims directed thereto. In said description and claims, all proportions are by weight unless otherwise stated.

Color concentrates comprising pigment dispersed in a vehicle comprising the above described graft copolymers have been found to be especially effective in coloring plastics in general. These graft copolymers may be made in accordance with the procedure set forth in copending application No. 55,148 filed on September 12, 1960, which is hereby incorporated and made a part of the disclosure of this application.

As set forth in said application, the 2-hydroxy-methyl-5-norbornene is preferably homopolymerized in mass and is initiated by "catalysts" or polymerization initiators of the free radical type such as di-tertiary butyl peroxide that decompose at temperatures of 110° to 150° C. After the homopolymerization is completed, methyl methacrylate monomers are gradually added to the batch containing the preformed homopolymer to form the graft copolymer.

Included among the plastics for which color concentrates comprising pigment in the above described graft copolymer when used as a vehicle give excellent results are polyvinyl chlorides, polystyrenes, acrylic plastics, acrylonitrile as well as cellulosics such as cellulose acetate, cellulose propionate and cellulosoacetobutyrate.

It has been further found that the color concentrates containing the graft copolymer vehicles may be used to color polyethylene (both high and low density) as well as polypropylene. When using these compositions to color polypropylene, it is preferable to include in the vehicle a material which has a plasticizing effect on the graft copolymer. Such a material is preferably either compatible with or a solvent for the polypropylene as well as any resinous ingredients in the vehicle. Materials such as chlorinated triphenyls and biphenyls, dioctyl adipate, dioctyl azelate, dioctyl sebacate as well as diesters of 2-hydroxymethyl-5-norbornene and dicarboxylic acids such as adipic, sebacic and azelaic acids have been found to be very effective in this plasticizing function.

Any of the usual types of pigments, both organic and inorganic can be used in the process of the invention. Pigments which have been used successfully include phthalocyanine blue; phthalocyanine green; titanium dioxide, both the anatase and rutile types; chrome yellow; chrome green; carbon blacks; iron oxides; iron blues; cadmium colors; dianisidine blue; Quinacridone Red; and molybdate orange.

The improvement in the color strength and uniformity of dispersions produced by the color concentrates of this invention in the coloring of polyolefins such as polypropylene is especially significant with respect to white pigments such as titanium dioxide. Since these white pigments are used in producing tints of all colors, the ability of the color concentrate to give excellent dispersion and color strength results in excellent tints.

For the sake of convenience in describing this invention, the pigment vehicle may be considered to comprise a resinous binder and optionally a plasticizing material. The vehicle is in effect the continuous phase, preferably solid, in which the pigment is dispersed. In order to achieve the desirable results of this invention either the resinous binder or the plasticizing material must be a compound of 2-hydroxymethyl-5-norbornene. The compositions being presently considered contain a graft copolymer of 2-hydroxymethyl-5-norbornene as the resinous binder. As will be discussed hereinafter in greater detail, the plasticizing material may be a 2-hydroxymethyl-5-norbornene compound such as diesters of 2-hydroxymethyl-5-norbornene and saturated dicarboxylic acids.

The percentage of pigment in the color concentrates will vary primarily with the pigments used in the specific compositions. It is well known that some pigments, such as carbon black, because of their relatively large surface areas, have a greater tendency to absorb resinous materials than others such as chrome orange, chrome yellow or titanium dioxide, and for this reason the latter type pigments can be dispersed in less vehicle. Also, the specific gravities of the pigments are a factor in determining the best proportions of pigments to be used. For example, carbon black having a lower specific gravity could be present in less proportions than the heavier metallic oxide pigments. Generally speaking, the color concentrates prepared according to my invention will preferably contain from about 10 to 80 percent by weight of pigment depending for the most part on the particular pigment used. For instance, using a pigment such as carbon black, which has high absorptive powers for resinous materials and a relatively low specific gravity the pigment may represent only 10–20 percent of the total color concentrate.

With respect to the plasticizing material used, it is preferable that the chlorinated triphenyl constitute from 25% to 50% of the vehicle weight. Where dioctyl esters or the diesters of 2-hydroxymethyl-5-norbornene are used it is preferable that the plasticizer constitute from 10% to about 50% and most preferably from 14% to 28% of the vehicle weight.

When the color concentrates of this invention are used to color plastics, according to conventional practices, it may be expected that the color concentrate will be used in such quantity that the amount of pigment in the final colored plastic article will conventionally constitute up to 5% of the article weight. While higher proportions of pigment may be incorporated, such proportions are commercially uneconomical.

It has been further found that vehicles comprising polyolefins and diesters of 2-hydroxymethyl-5-norbornene and saturated dicarboxylic acids such as adipic, azelaic and sebacic acids provide excellent continuous phases for pigment dispersions to form color concentrate compositions which are very effective in the coloring of polyolefins including polypropylene as well as high density and low density polyethylene. In these compositions, the proportions of pigment present remain the same as previously set forth. It is preferable that the vehicle comprises from 10 to 40% and most preferably from 10 to 20% of diester and the remainder is polyolefin. It has been further found that color concentrates comprising polyolefins, 2-hydroxymethyl-5-norbornene diesters and pigments giving particularly effective results may be made according to a new process.

According to conventional practice for making color concentrates, the mixture of pigment and vehicle is placed on the mixing, milling or grinding apparatus and heated to a temperature at which the vehicle which is primarily resinous enters the fluid state and the milling or dispersion operation is carried out at said temperature, or higher.

On a 2-roll mill, this fluid state may be readily characterized by the formation of a rolling bank in the nip of the rolls. I have now found that more desirable color concentrates may be formed when using a polyolefin resin in the vehicle if after reaching the fluid state, the mixture being milled or mixed is permitted to cool to a point where the vehicle leaves the fluid state (this is characterized on the mill by the disappearance of the rolling bank) and the milling is carried out at said lowered temperature. Care should be taken so that the mixture being mixed or milled does not cool to the point that it ceases to be in the plastic state (the state in which the mixture is pliable and tenacious or sticky) and passes into the brittle state. On a 2-roll mill, in the brittle state, the mixture will no longer adhere to the rolls and falls away from said rolls.

It should be noted that in the plastic state, the mixture being subjected to dispersion will have the greatest shearing stresses. Therefore, when the dispersion is being conducted on electrically powered apparatus such as 2-roll mills and Banbury Mixers, the power input will be at a maximum. When employing such electrically powered apparatus, the most suitable temperature for the dispersion operation may be determined by first heating the mixture until the vehicle is in the fluid state and then gradually lowering the temperature while carrying out the dispersion until the power input, as indicated by the wattmeter for said apparatus reaches a peak. The dispersion operation is then conducted at this peak.

The following examples will further illustrate the practice of this invention:

*Example 1*

Parts
Chrome yellow pigment _____ 60
A graft copolymer made by the addition polymerization of methyl methacrylate in the presence of 2-hydroxymethyl-5-norbornene homopolymer (homopolymer content in copolymer is about 20%) _____ 40

The above ingredients are mixed on a two-roll mill at a temperature of about 270° F. for a period of about 15 minutes, at which time, a homogeneous dispersion of pigment in the graft copolymer (continuous phase) is formed. The mixture is then removed from the mill, permitted to cool and broken into color concentrate granules or chips. Such chips may then be used for coloring plastics by incorporating said color concentrate chips into molten plastics in the conventional manner.

*Examples 2 through 5*

Example 1 is reepated using the graft copolymer of Example 1 and the following pigments in the following proportions:

| Example | Parts of Graft Copolymer | Pigment | Parts of Pigment |
|---|---|---|---|
| 2 | 75 | Carbon Black | 25 |
| 3 | 75 | Phthalocyanine Blue | 25 |
| 4 | 40 | Chrome Green | 60 |
| 5 | 75 | Quinacridone Red (U.S. Pat. 2,844,485). | 25 |

*Example 6*

Parts
Phthalocyanine green pigment _____ 25
A graft copolymer made by the addition polymerization of methyl methacrylate in the presence of 2-hydroxymethyl-5-norbornene homopolymer _____ 50
Arochlor 5460 (a chlorinated p-terphenyl having a 60% chlorine content by weight) _____ 25

The above ingredients are mixed on a two-roll mill at a temperature of about 250° F. for a period of 15 minutes, at which time, a homogeneous dispersion of pigment in the graft copolymer and Arochlor 5460 is formed. The mixture is then removed from the mill, permitted to cool and ground into color concentrate granules or chips.

Similar color concentrate compositions are also made in the same manner using phthalocyanine blue and quinacridone red pigments in place of phthalocyanine green. As controls, conventional color concentrates are prepared in the same manner using 25 parts pigment in a 75 parts polypropylene vehicle for each of the green, blue and red pigments of this example. These controls are prepared by milling on a 2-roll for about 15 minutes at 340° F.

Each of the three color concentrates and each of the corresponding control concentrates are then incorporated as coloring material into polypropylene in a conventional extrusion molding apparatus, 2 parts of color concentrate being used per 98 parts of polypropylene and each mixture is molded into a slab. The slabs containing the graft copolymer-Arochlor color concentrates display from 50% to 100% increase over the control in color strength as well as excellent uniformity in color. At 100X magnification under a microscope, there is an absence of color agglomerates. The controls display a substantial degree of color agglomeration.

*Example 7*

Parts
Titanium dioxide _____ 40
Graft copolymer of Example 6 _____ 40
Arochlor 5460 _____ 20

The procedure of Example 6 is repeated using the above ingredients and the resulting color concentrate chip is compared with a color concentrate chip of 40% titanium dioxide and 60% polypropylene. Both chips are incorporated into a polypropylene composition in extrusion molding apparatus and slabs are prepared and compared. Besides greater opacity, the graft-copolymer, Arochlor and pigment color concentrate-containing slab is uniformly pigmented. On the other hand, the control, in marked contrast, has a great number of color agglomerates and a pigment dispersion lacking in uniformity.

Example 8

Example 6 is repeated using the same conditions and proportions except that the color concentrates are incorporated into linear polyethylene. The results are the same as in Example 6.

Example 9

Example 6 is repeated using the same conditions and proportions except that only the green color concentrate is tried and that is incorporated into acrylonitrile rubber with excellent results.

Example 10

| | Parts |
|---|---|
| Medium cadmium red pigment | 25 |
| The graft copolymer described in Example 6 | 50 |
| Arochlor 5460 | 25 |

A color concentrate of the above ingredients is prepared in accordance with the procedure of Example 1. The color concentrate chips are then incorporated as coloring material into polystyrene in conventional extrusion molding apparatus, 2 parts of color concentrate being used per 98 parts of polystyrene and molded into a slab. The resulting slab displays excellent color strength as well as excellent uniformity of pigment dispersion.

The color concentrate of Example 10 is incorporated into polyvinyl chloride and polypropylene with the same excellent results.

Example 11

| | Parts |
|---|---|
| Phthalocyanine green | 30 |
| Graft copolymer described in Example 1 | 50 |
| Dioctyl azelate | 20 |

A color concentrate of the above ingredients is prepared in accordance with the procedure of Example 1. The color concentrate chips are then incorporated as coloring material into polystyrene in conventional extrusion molding apparatus, 2 parts of color concentrate being used per 98 parts of polypropylene and molded into a slab. The resulting slab displays excellent color strength and good uniformity of pigment dispersion.

Example 12

Example 11 is repeated using the same ingredients, proportions and conditions except that dioctyl adipate is used instead of dioctyl azelate. The results are very similar to those of Example 11. Dioctyl sebacate may also be substituted for dioctyl azelate with similar results.

Example 13

Example 11 is repeated using the same ingredients and proportions except that Carbon Black pigment is used in place of phthalocyanine green pigment and in place of dioctyl azelate, there is used the diester of 2-hydroxymethyl-5-norbornene and azelaic acid. The resulting slab displayed even better color strength and uniformity of pigment dispersion than did the slab of Example 11.

Example 14

| | Parts |
|---|---|
| Quinacridone red (U.S. Pat. 2,844,485) | 25 |
| Graft copolymer described in Example 1 | 55 |
| Diester of 2-hydroxymethyl-5-norbornene and sebacic acid | 20 |

The resulting slab displayed properties equivalent to those of the slab in Example 13.

Example 15

Example 14 is repeated using the same ingredients, proportions and conditions except that the the diester is the diester of 2-hydroxymethyl-5-norbornene and adipic acid. The results are the same as in Example 14.

Example 16

55 parts of polypropylene ("Pro-fax 6511" a stereo-specific polypropylene having a melting point of 333° F. by birefringence method), 20 parts of the diester of 2-hydroxymethyl-5-norbornene and sebacic acid and 25 parts of carbon black pigment are milled on a 2-roll mill, the temperature of the mill being raised until the mixture in the nip of the rolls forms a fluid rolling bank. The temperature is 340° F. As the milling is continued, the temperature of the rolls is lowered until the point where the rolling bank disappears and the mixture in the nip of the rolls is in the form of a series of longitudinal folds indicating that the mixture is in the plastic state but is not flowable without external pressure. The temperature of this condition is 310° F. Milling is continued in this condition for 10 minutes, after which, the mixture is removed from the rolls, permitted to cool and broken into color concentrate granules or chips. When these chips are used for coloring polypropylene by incorporation into the molten polypropylene in the conventional manner, the resulting color strength and uniformity of dispersion are among the best of this invention.

Example 17

| | Parts |
|---|---|
| Polypropylene | 55 |
| Diester of 2-hydroxymethyl-5-norbornene and azelaic acid | 20 |
| Phthalocyanine blue | 25 |

Example 16 is repeated using the above ingredients. The resulting color concentrates have properties very similar to those of Example 16.

Example 18

| | Parts |
|---|---|
| Polypropylene | 77.5 |
| Diester of 2-hydroxymethyl-5-norbornene and sebacic acid | 10.0 |
| Phthalocyanine green | 12.5 |

Example 16 is repeated using the above ingredients. The resulting color concentrates have properties very similar to those of Example 16.

Example 19

| | Parts |
|---|---|
| Polypropylene | 68.2 |
| Diester of 2-hydroxymethyl-5-norbornene and adipic acid | 6.8 |
| Phthalocyanine green pigment | 25.0 |

Example 16 is repeated using the above ingredients. The resulting color concentrates have properties very similar to those of Example 16.

Example 20

| | Parts |
|---|---|
| Polyethylene (Hifax-high density linear having a melting point of 268° F.) | 68.2 |
| Diester of 2-hydroxymethyl-5-norbornene and adipic acid | 6.8 |
| Carbon Black pigment | 25.0 |

The above ingredients are milled on a 2-roll mill, the temperature of the mill being raised until the mixture in the nip of the rolls forms a fluid rolling bank. The temperature is 270° F. As the milling is continued, the temperature of the rolls is lowered until the point where the rolling bank disappears and the mixture in the nip of the rolls is in the form of a series of longitudinal folds indicating that the mixture is in the plastic state but is not flowable without external pressure. The temperature of this condition is 235° to 240° F. Milling is continued in this condition for 10 minutes, after which, the mixture is removed from the rolls, permitted to cool and broken into color concentrate granules or chips. When these chips are used for coloring high density polyethylene, results are achieved which are comparable with those of Example 19.

Example 21

Example 20 is repeated using the same procedure and ingredients with the following exceptions: the polyethylene used is low density polyethylene having a Melt Index of 1.7 to 2.4 dg./minute at 190° C.; the rolling bank forms at about 220° F. and the mixture is milled at 190° F. When the color concentrate formed is used in the coloring of low density polyethylene, the results achieved are comparable with those of Example 19.

Although the invention has been particularly described with respect to the preparation of color concentrate compositions for use in coloring plastics, it is obvious that it is not limited to such systems. For instance, color concentrates prepared by the process of the invention can be used in the preparation of pigmented coatings, inks, etc. A common practice in the protective coatings and ink industries is to mill pigments into the vehicles on a 2-roll mill to obtain pigmented chip dispersions or color concentrates and then these pigmented chips are dispersed in the desired vehicle.

While the color concentrate compositions produced according to the above examples have been primarily solids, it will be obvious that the color concentrates may be used in the form of pastes which may be made according to conventional techniques e.g. mixing the solid color concentrate chip with a solvent or by increasing the plasticizer content of the color concentrate compositions.

Numerous other pigments, both organic and inorganic, have been used in our process, however, since the procedure is analogous in all cases it will be unnecessary to repeat them here. From the description of the invention in the above illustrative examples it will be apparent to those skilled in the art that numerous modifications of the invention may be practiced within the valid scope of the invention as defined in the appended claims.

What is claimed is:

1. A polyolefin color concentrate composition comprising pigment dispersed in a vehicle of a mixture of a polyolefin selected from the group consisting of polyethylene and polypropylene and a diester of 2-hydroxymethyl-5-norbornene and a dicarboxylic acid selected from the group consisting of adipic, azelaic and sebacic acids said pigment being 10 to 80% by weight of the composition and said diester being from 10 to 50% of the vehicle weight.

2. The color concentrate composition of claim 1 wherein said vehicle is a solid.

3. The color concentrate composition of claim 1 wherein said polyolefin is polypropylene.

4. The color concentrate composition of claim 1 wherein said polyolefin is high density polyethylene.

5. The color concentrate composition of claim 1 wherein said polyolefin is low density polyethylene.

6. The color concentrate composition of claim 1 wherein said diester is a diester of 2-hydroxymethyl-5-norbornene and azelaic acid.

7. The color concentrate composition of claim 1 wherein said diester is a diester of 2-hydroxymethyl-5-norbornene and adipic acid.

8. The color concentrate composition of claim 1 wherein said diester is a diester of 2-hydroxymethyl-5-norbornene and sebacic acid.

References Cited by the Examiner

UNITED STATES PATENTS

| | | | |
|---|---|---|---|
| 2,526,395 | 10/1950 | Nichols et al. | 260—31.8 |
| 2,649,382 | 8/1953 | Vesce | 260—41 |
| 2,793,195 | 5/1957 | Vesce | 260—31.8 |
| 2,893,970 | 7/1959 | Caldwell et al. | 260—41 |
| 2,940,949 | 6/1960 | Mullin | 260—31.8 |
| 2,980,964 | 4/1961 | Dilke | 260—31.8 |

OTHER REFERENCES

Mattiello: Protective and Decorative Coatings; John Wiley & Sons, Inc.; pages 2–5; 1946.

MORRIS LIEBMAN, *Primary Examiner.*

LEON J. BERCOVITZ, *Examiner.*